UNITED STATES PATENT OFFICE.

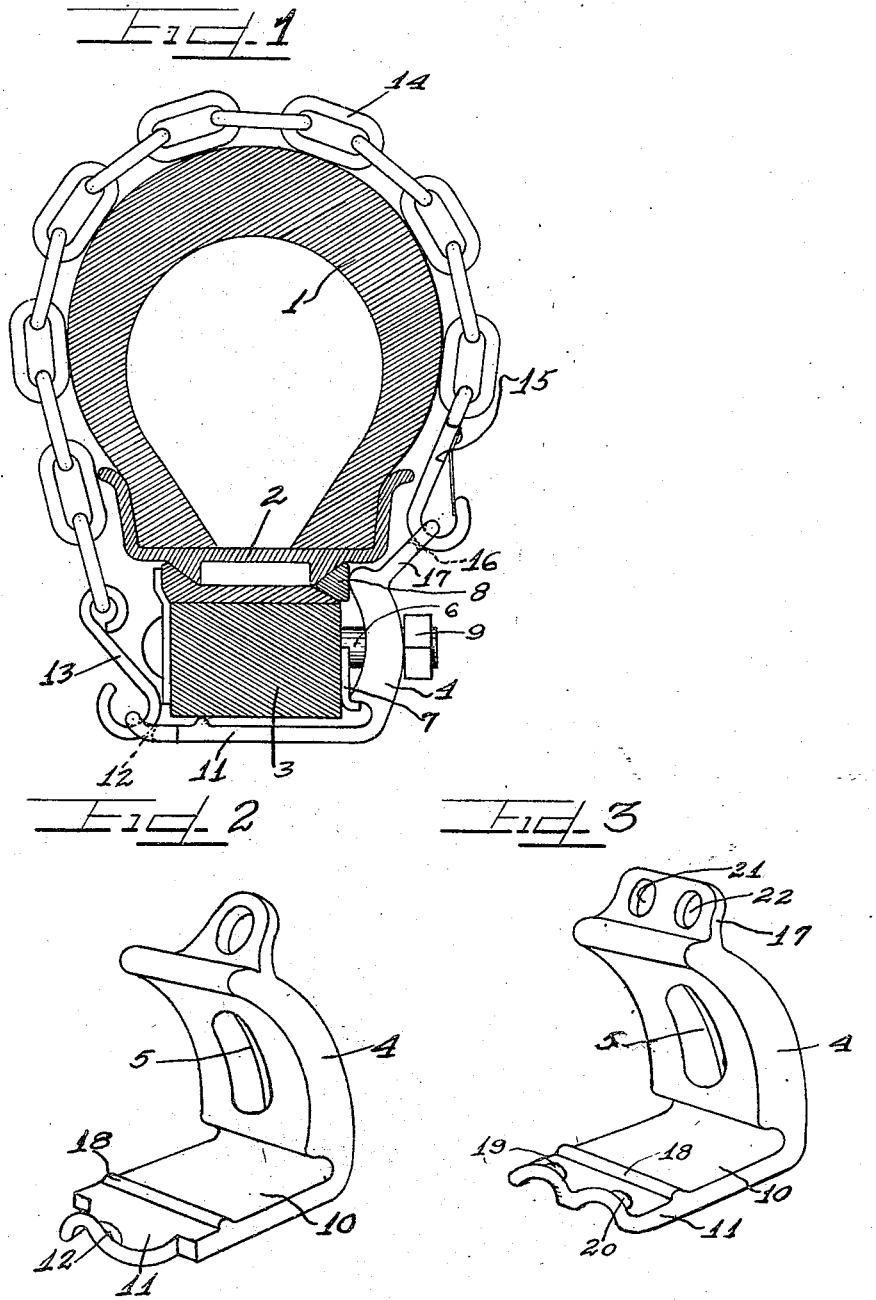

JOSEPH L. DONAT, OF CHICAGO, ILLINOIS.

ANTISKID DEVICE.

1,421,922.  Specification of Letters Patent.  Patented July 4, 1922.

Application filed July 18, 1921. Serial No. 485,473.

*To all whom it may concern:*

Be it known that I, JOSEPH L. DONAT, a citizen of the United States, and a resident of the city of Chicago, in the county of Cook and State of Illinois, have invented certain new and useful Improvements in an Antiskid Device; and I do hereby declare that the following is a full, clear, and exact description of the same, reference being had to the accompanying drawings, and to the numerals of reference marked thereon, which form a part of this specification.

This invention relates to anti-skid devices and particularly to devices which are adapted to secure chains and similar flexible anti-skid means around the tires of motor vehicles to prevent skidding and to add to the tractive efficiency thereof. When traveling on wet pavements and muddy or sandy roads it is desirable that anti-skid means be employed, and it is of course also desirable that it be possible to quickly apply such devices and that they be applied in such a manner that the wheel or tire on which they are mounted is not injured thereby.

It is an object of the present invention to provide anti-skid devices which are attached to means which also act to secure the tire rim in position on the wheel.

It is another object of this invention to provide means for securing a tire rim in position which have means integral therewith to which anti-skid devices may be removably attached.

It is another object of this invention to provide tire rim clamps or wedges which have means associated therewith to which flexible anti-skid means may be attached.

It is an important object of this invention to provide improved anti-skid means which may be stored in a small space and which may be conveniently and quickly attached to a wheel without injuring the same.

Other and further important objects of this invention will be apparent from the disclosures in the specification and the accompanying drawings.

The invention (in a preferred form) is shown on the drawings and hereinafter more fully described.

On the drawings:

Figure 1 is a central vertical section through a pneumatic tire and the attaching means therefor showing an anti-skid chain which is held in position thereon by the improved attaching means of this invention.

Figure 2 is a perspective view of one form of the attaching means.

Figure 3 is a perspective view of a modified form of the attaching means.

As shown on the drawings:

The improved attaching means for the anti-skid devices are adapted to be secured to the felloe of the wheel in place of the usual tire rim attaching clamps or wedges and said attaching means serve the dual purpose of securing the anti-skid chain or other anti-skid means in position around the tire 1 and securing a rim 2 in position on the felloe which is represented by the reference numeral 3. The attaching means shown in Figure 1 comprise a concave plate 4 which is slotted at 5 to receive the end of a bolt 6 which is engaged through the felloe 3, and said plate 4 is drawn tightly against a plate 7 on the felloe, and a locking ring 8, which wedgingly engages the under side of the rim 2 to secure the same to the felloe, by means of a nut 9 on the end of said bolt 6 outside the plate 4. Integral with the plate 4 and extending under the felloe 3 is a horizontal plate 10, which is provided at its outer end with an integral boss 11 which is apertured at 12 to receive a hook or other suitable attaching means 13 on the end of an anti-skid chain 14 which extends around the tire and which is secured at its other end by means of the engagement of a hook or other suitable fastening means 15 thereon through an aperture 16 in an ear 17 which is integral with the plate 4 and which extends upwardly and outwardly therefrom. The plate 11 is held away from the bottom of the felloe 3 by means of an integral boss 18 thereon and there is consequently no danger of the hook 13 engaging the side of the felloe and marring or otherwise defacing the same.

In the form of attaching means shown in Figure 3, the boss 11 and the ear 17 are each provided with two apertures which are designated by the reference numerals 19 and 20, and 21 and 22, respectively, and which afford means whereby a double connection with the chain 14 may be made or whereby two chains may be secured around the tire.

It will be apparent from the foregoing description that this invention provides an anti-skid means which may be conveniently attached to the tire rim attaching means, and that said attaching means may be left in the usual position, the normal function thereof being in no way interfered with. The device is economical since the apertured projecting portions in which the hooks on the chain are engaged are an integral part of the attaching clamps or plates and do not add materially to the expense of manufacture thereof. The chains may be stored in a small space in the vehicle and may be quickly attached by engaging the hooks on the ends thereof in the apertures formed in the extensions or ears on the tire rim securing means, and the chains may of course be easily detached by the disengagement of these hooks.

While various forms of attaching means have been illustrated herein, it is of course understood that this invention may be easily applied to any form of tire rim attaching means by the simple expedient of forming apertured extensions or ears thereon, and it is also evident that any form of anti-skid means may be conveniently attached to these clamps when so adapted.

I am aware that numerous details of construction may be varied through a wide range without departing from the principles of this invention, and I therefore do not purpose limiting the patent granted otherwise than necessitated by the prior art.

I claim as my invention:

1. In a rim securing clamp, two portions at substantially right angles to each other, one adapted to extend across the inner face of the felloe and the other to extend across a lateral face thereof, the last-mentioned portion having a slot to receive the rim securing bolt, perforated lugs projecting from said portions, one of said lugs standing obliquely to its portion, whereby when the securing clamp is in place on the wheel, the perforations in said lugs will be conveniently located to receive hooks for securing anti-skid chains in place.

2. In a rim securing clamp, two portions at substantially right angles to each other, one adapted to extend across the inner face of the felloe and the other to extend across a lateral face thereof, the last-mentioned portion having a slot to receive the rim securing bolt, perforated lugs projecting from said portions, one of said lugs standing obliquely to its portion, whereby when the securing clamp is in place on the wheel, the perforations in said lugs will be conveniently located to receive hooks for securing anti-skid chains in place, a rib on the first-mentioned portion of the rim securing clamp serving to space said portion away from the felloe and the lugs on said portion extending beyond the edge of the felloe sufficiently to ensure that the hooks engaging said lugs will not contact with the felloe.

In testimony whereof I have hereunto subscribed my name in the presence of two subscribing witnesses.

JOSEPH L. DONAT.

Witnesses:
CARLTON HILL,
JAMES M. O'BRIEN.